(12) United States Patent
Kim et al.

(10) Patent No.: US 11,099,419 B2
(45) Date of Patent: Aug. 24, 2021

(54) DISPLAY DEVICE

(71) Applicant: Samsung Display Co., Ltd., Yongin-Si (KR)

(72) Inventors: Eon-Young Kim, Asan-si (KR); Jae Hong Kim, Asan-si (KR); Nam-Wook Lee, Seongnam-si (KR); Jang-Bog Ju, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/867,515

(22) Filed: May 5, 2020

(65) Prior Publication Data

US 2021/0026191 A1    Jan. 28, 2021

(30) Foreign Application Priority Data

Jul. 25, 2019  (KR) .......... 10-2019-0090241

(51) Int. Cl.
*G02F 1/1335* (2006.01)
*G02F 1/1368* (2006.01)
*G02F 1/1362* (2006.01)

(52) U.S. Cl.
CPC ...... *G02F 1/133514* (2013.01); *G02F 1/1368* (2013.01); *G02F 1/136286* (2013.01); *G02F 1/136222* (2021.01)

(58) Field of Classification Search
CPC ............................................. G02F 1/136286
See application file for complete search history.

(56) References Cited

U.S. PATENT DOCUMENTS

| | | | | |
|---|---|---|---|---|
| 2010/0271582 | A1* | 10/2010 | Yamakawa | G02F 1/136286 349/138 |
| 2015/0277192 | A1* | 10/2015 | Park | G02F 1/136286 349/43 |
| 2017/0153517 | A1* | 6/2017 | Shin | G02F 1/134336 |

FOREIGN PATENT DOCUMENTS

| | | |
|---|---|---|
| KR | 10-2016-0039763 A | 4/2016 |
| KR | 10-2016-0056494 A | 5/2016 |
| KR | 10-2017-0117261 A | 10/2017 |
| KR | 10-2019-0008462 A | 1/2019 |
| KR | 10-2019-0038111 A | 4/2019 |

* cited by examiner

*Primary Examiner* — Sang V Nguyen
(74) *Attorney, Agent, or Firm* — Innovation Counsel LLP

(57) ABSTRACT

The present disclosure relates to a display device that includes: a first conductor provided on a substrate; a first insulating layer provided on the first conductor; a second conductor provided on the first insulating layer; a second insulating layer provided on the second conductor; and a third conductor provided on the second insulating layer, wherein, the first conductor has a first edge and a second edge extending in different directions, the second conductor includes a first extension and a second extension extending in different directions, the first insulating layer and the second insulating layer collectively include a first opening provided on the first conductor and the second conductor, the third conductor is electrically connected to the first conductor and the second conductor through the first opening, the first extension extends parallel to the first edge, and the second extension extends parallel to and overlaps with the second edge.

20 Claims, 11 Drawing Sheets

DISPLAY DEVICE

CROSS-REFERENCE TO RELATED APPLICATION

This application claims priority to and the benefit of Korean Patent Application No. 10-2019-0090241 filed in the Korean Intellectual Property Office on Jul. 25, 2019, the entire contents of which are incorporated herein by reference.

BACKGROUND (a) Technical Field

The present disclosure relates to a display device.

(b) Description of the Related Art

Display devices such as liquid crystal displays (LCD) and an organic light emitting diode (OLED) displays each include a display panel including a plurality of pixels for displaying images. The pixels form part of a display unit for displaying an image, and may include a pixel circuit portion including at least one transistor, and a display unit connected to the pixel circuit portion. A pixel electrode for receiving a data signal may be provided in the display unit, may be connected to at least one transistor of the pixel circuit portion, and may receive the data signal.

The display panel includes a substrate and a plurality of layers attached to and patterned on the substrate. The plurality of layers includes a conductive layer and an insulating layer, and at least one insulating layer may be provided between different conductive layers. An opening may be formed in an insulating layer provided near a plurality of conductors so as to electrically connect a plurality of conductors provided on the different conductive layers.

The above information disclosed in this Background section is only for enhancement of understanding of the background of the invention and therefore it may contain information that does not form the prior art that is already known in this country to a person of ordinary skill in the art.

SUMMARY

The present inventive concept has been made in an effort to prevent defects around an opening of an insulating layer for an electrical connection among a plurality of conductors provided on different conductive layers in a display panel.

An embodiment of the present inventive concept provides a display device including: a substrate; a first conductor provided on the substrate; a first insulating layer provided on the first conductor; a second conductor provided on the first insulating layer; a second insulating layer provided on the second conductor; and a third conductor provided on the second insulating layer, wherein, the first conductor has a first edge and a second edge extending in different directions from each other, the second conductor includes a first extension and a second extension extending in different directions from each other, the first insulating layer and the second insulating layer collectively include a first opening provided on the first conductor and the second conductor, the third conductor is electrically connected to the first conductor and the second conductor through the first opening, the first extension extends in parallel to the first edge, and the second extension extends in parallel to overlaps with the second edge.

The display device may further include: a fourth conductor provided on the substrate; and a color filter provided on the substrate, wherein the second insulating layer further includes a second opening provided on the fourth conductor, the color filter includes a third opening, and the first opening and the second opening are provided in the third opening.

The display device may have wherein: the second edge is an edge facing toward and closest to the second opening from among edges of the first conductor.

The display device may have wherein: the second extension and the second edge overlapping each other overlap the third opening.

The display device may have wherein: the first opening and the second opening are separately disposed in a first direction, and the second edge extends in a second direction that is different from the first direction.

The display device may further include: a signal line separated from the first conductor, wherein the second extension is separated from the signal line.

The display device may have wherein: the signal line is provided in a same layer as the first conductor on the substrate.

The display device may have wherein: the first opening has a third edge, and the third edge overlaps the second extension of the second conductor.

The display device may have wherein: the first opening further has a fourth edge connected to the third edge, and the fourth edge overlaps the first extension.

The display device may have wherein: the second insulating layer includes an organic insulating material.

Another embodiment of the present inventive concept provides a display device including: a substrate; a first conductor provided on the substrate; a first insulating layer provided on the first conductor; a second conductor provided on the first insulating layer; a second insulating layer provided on the second conductor; a third conductor provided on the second insulating layer; and a color filter provided on the substrate, wherein the first insulating layer and the second insulating layer have a first opening provided on the first conductor and the second conductor and a second opening separated from the first opening, the color filter includes a third opening, the first opening and the second opening are provided in the third opening, the third conductor is electrically connected to the first conductor and the second conductor through the first opening, the first conductor includes a first edge provided toward the second opening, and the second conductor includes a first extension extending in parallel to and overlapping with the first edge.

The display device may further include: a fourth conductor provided on the substrate, wherein the second opening is provided on the fourth conductor.

The display device may have wherein: the first opening and the second opening are separately disposed in a first direction, and the first edge extends in a second direction that is different from the first direction.

The display device may further comprise: a signal line separated from the first conductor, wherein the first extension is separated from the signal line.

The display device may have wherein: the signal line is provided in a same layer as the first conductor on the substrate.

The display device may have wherein: the first opening includes a second edge, and the second edge overlaps the first extension.

The display device may have wherein: the second conductor further includes a second extension connected to the first extension and extending in a direction that is different from an extending direction of the first extension, the first opening further has a third edge connected to the second edge, and the third edge overlaps the second extension.

The display device may have wherein: the second insulating layer includes an organic insulating material.

Yet another embodiment of the present inventive concept provides a display device including: a substrate; a voltage line and a signal line provided on the substrate and separated from each other; a first conductor provided on a first side of the signal line in a plan view; a second conductor provided on a second side that is opposite to the first side of the signal line in the plan view; an insulating layer having a first opening provided on the first conductor and a second opening provided on the second conductor; and a third conductor provided on the insulating layer and electrically connected to the voltage line and the first conductor through the first opening, wherein the voltage line has an edge facing the signal line, and the first conductor includes an extension extending in parallel to overlapping with the edge.

The display device may further include: a color filter provided on the substrate and including a third opening, wherein the first opening and the second opening are provided in the third opening.

According to the embodiments of the present inventive concept, defects around an opening of an insulating layer for an electrical connection among a plurality of conductors provided on different conductive layers in a display panel may be prevented.

DETAILED DESCRIPTION OF THE EMBODIMENTS

Figure 1:
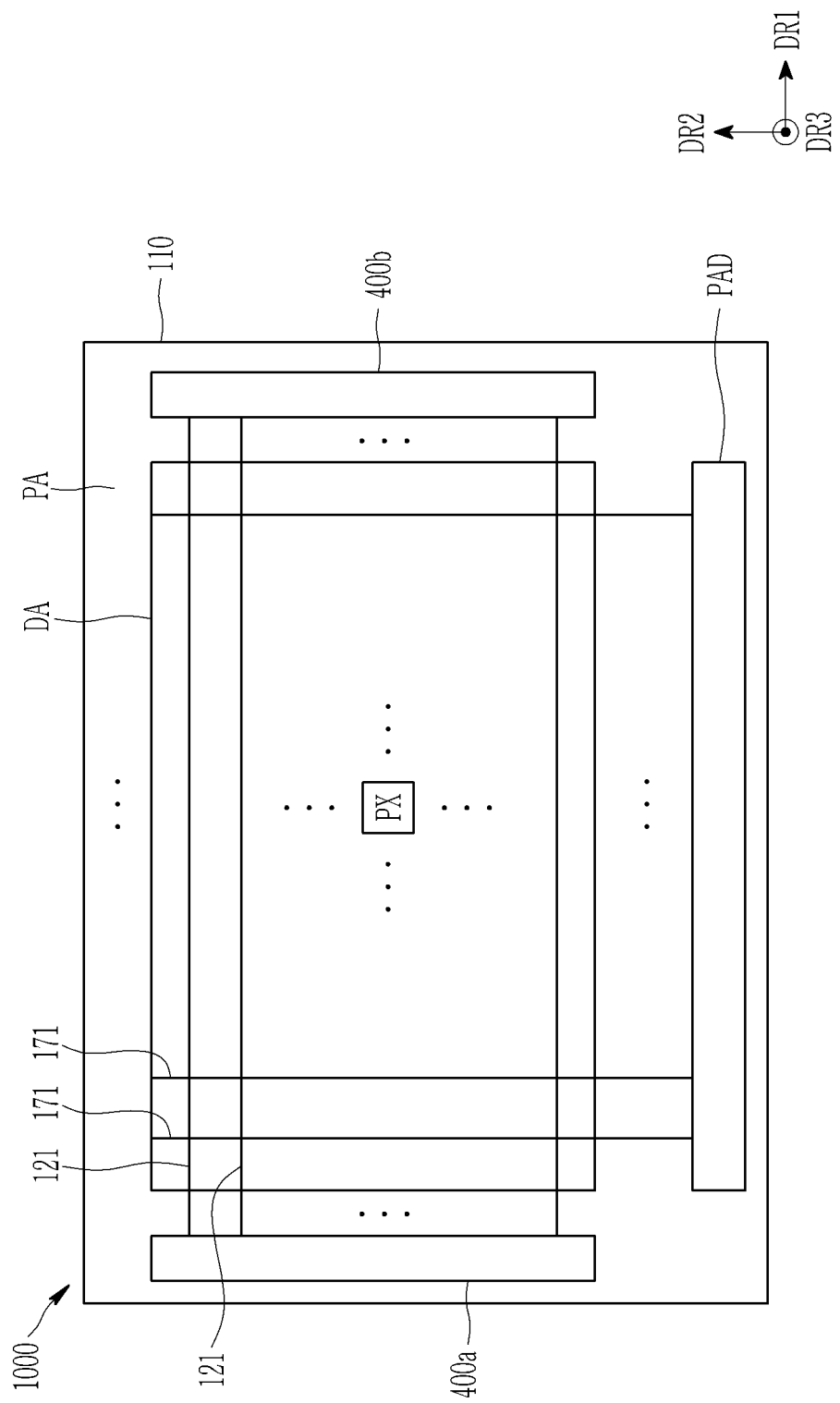
FIG. 1 shows a plan view of a display device according to an embodiment of the present inventive concept.

The present inventive concept will be described more fully hereinafter with reference to the accompanying drawings, in which embodiments of the invention are shown. As those skilled in the art would realize, the described embodiments may be modified in various different ways, all without departing from the spirit or scope of the present inventive concept.

The drawings and description are to be regarded as illustrative in nature and not restrictive, and like reference numerals designate like elements throughout the specification.

The size and thickness of each configuration shown in the drawings are arbitrarily shown for better understanding and ease of description, and the present inventive concept is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Furthermore, in the specification, the word "on" or "above" means positioned on or below the object portion, and does not necessarily mean positioned on the upper side of the object portion based on a gravitational direction.

Unless explicitly described to the contrary, the word "comprise" and "include" and variations such as "comprises" or "comprising" or "includes" or "including" will be understood to imply the inclusion of stated elements but not the exclusion of any other elements.

Throughout the specification, a plan view represents a view for observing a side that is parallel to two directions (e.g., a first direction DR1 and a second direction DR2) crossing each other, and a cross-sectional view represents a view for observing a side that is cut in a direction (e.g., a third direction DR3) that is perpendicular to a side that is parallel to the first direction DR1 and the second direction DR2. When two constituent elements overlap each other, it means that the two constituent elements overlap each other in the third direction DR3, for example, in the direction that is perpendicular to an upper side of a substrate.

A display device according to an embodiment of the present inventive concept will now be described with reference to FIG. 1 and FIG. 2.

Figure 2:
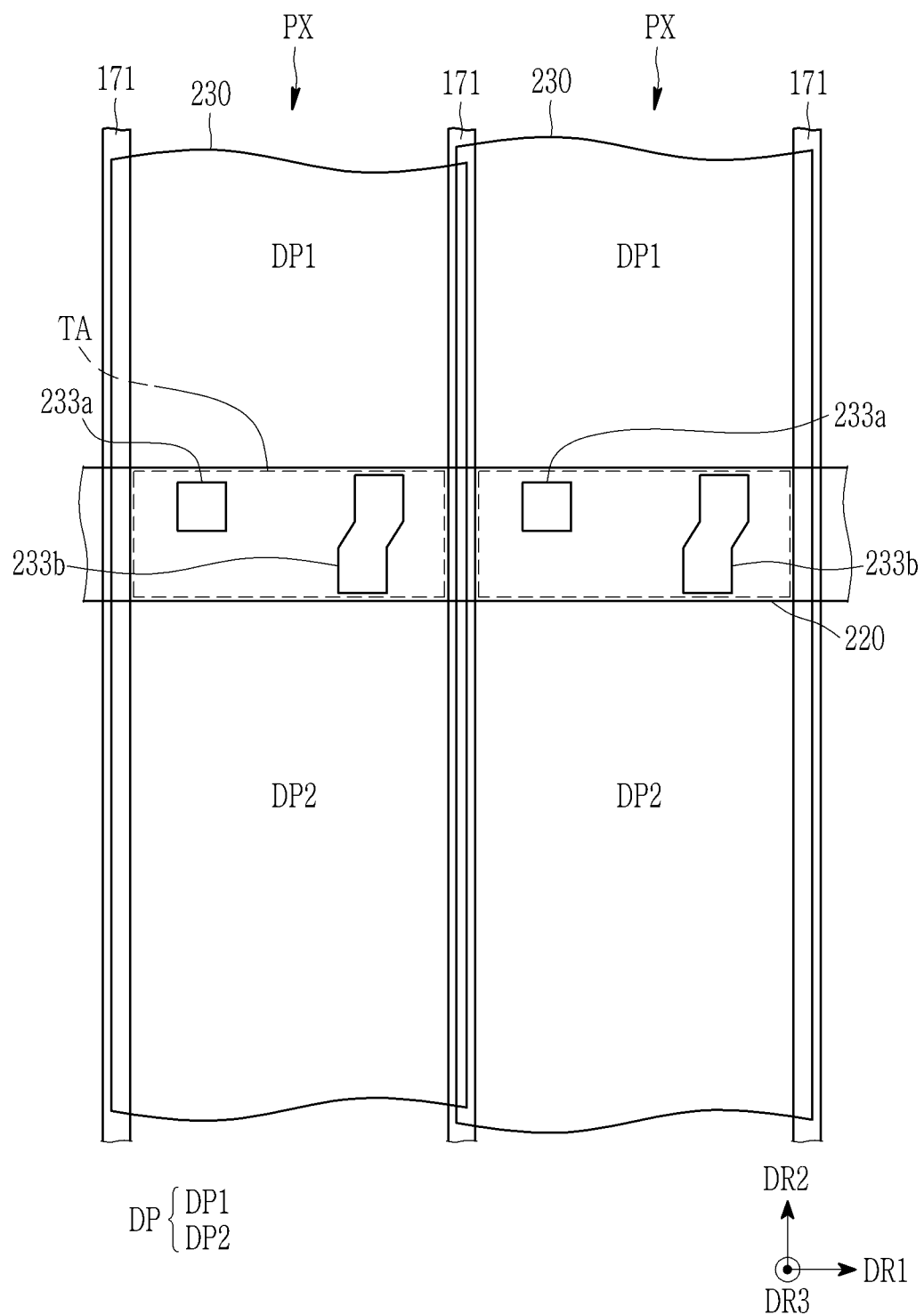
FIG. 2 shows a plan view of two neighboring pixels of a display device according to an embodiment of the present inventive concept.

FIG. 1 shows a plan view of a display device according to an embodiment of the present inventive concept, and FIG. 2 shows a plan view of two neighboring pixels of a display device according to an embodiment of the present inventive concept.

Referring to FIG. 1, the display device according to an embodiment of the present inventive concept includes a display panel 1000, and the display panel 1000 includes a substrate 110 including a display area DA and a peripheral area PA.

The display area DA is a region for displaying an image, and includes a plurality of pixels PX that are regularly disposed and a plurality of signal lines.

A plurality of signal lines may include a plurality of gate lines 121 and a plurality of data lines 171.

The gate lines 121 extend in a first direction DR1. The gate lines 121 may transmit gate signals including a gate-on voltage and a gate-off voltage.

The data lines 171 may extend in a second direction DR2 to cross the gate lines 121. The data lines 171 may transmit data signals.

The respective pixels PX are capable of displaying images, and they may display light with luminance corresponding to grays of respective image signals.

Referring to FIG. 2, the respective pixels PX may include a pixel circuit portion TA including at least one transistor and a display unit DP. Referring to FIG. 1 and FIG. 2, the pixel circuit portion TA may include at least one transistor connected to a gate line 121 and/or a data line 171 provided in the display area DA. The display unit DP may include a pixel electrode for receiving a data signal from the pixel circuit portion TA, and is a region through which light may be transmitted or on which light is displayed. The display unit DP and the pixel circuit portion TA for one pixel PX may or may not overlap each other in a plan view.

FIG. 2 illustrates the pixel PX including a pixel circuit portion TA and two display units DP1 and DP2. The two display units DP1 and DP2 may include a first display unit DP1 and a second display unit DP2 provided above and below the pixel circuit portion TA. However, the configuration of the pixel PX is not limited thereto, and it is modifiable in numerous variations.

A plurality of pixels PX may include at least two pixels for displaying different colors when the display panel 1000 is driven. For example, the two neighboring pixels PX shown in FIG. 2 may display different colors. When the display panel 1000 is driven, the pixel PX may output one of three primary colors of red, green, and blue, or one of four primary colors including white.

The display panel 1000 according to an embodiment of the present inventive concept may include a color filter 230 corresponding to the display unit DP of the pixel PX so as to display the color of the pixel PX. The color filter 230 may display one of the three primary colors of red, green, and blue, or one the four primary colors. Additionally, the color filter 230 may be transparent.

The color filter 230 may have at least one opening provided in the pixel circuit portion TA. FIG. 2 illustrates that the color filter 230 includes two openings 233a and 233b provided in the pixel circuit portion TA. In a plan view, a size of the opening 233b may be greater than a size of the opening 233a.

The display panel 1000 may further include a light blocking member 220 for blocking transmission of light. In a plan view, the light blocking member 220 may include a portion overlapping the pixel circuit portion TA of the display area DA and a portion overlapping the peripheral area PA. The light blocking member 220 may include a pigment such as carbon black.

The peripheral area PA is provided around the display area DA. Most of the peripheral area PA may be a non-display area for not displaying an image, differing from the display area DA, and it is not limited thereto.

The peripheral area PA may include driving circuit portions 400a and 400b, a pad PAD, and a plurality of wires.

The driving circuit portions 400a and 400b may be connected to a plurality of signal lines provided in the display area DA, for example, a plurality of gate lines 121.

The driving circuit portions 400a and 400b may apply a driving signal. The driving circuit portions 400a and 400b may sequentially scan gate signals and apply the same to a plurality of gate lines 121. Furthermore, the driving circuit portions 400a and 400b may apply a gate signal to a gate terminal of the transistor connected to the gate line 121 from among the transistors provided on the pixel circuit portion TA of the display area DA.

The driving circuit portion 400a and the driving circuit portion 400b may be provided on different sides of the display area DA. Alternatively, one of the driving circuit portions 400a and 400b may be omitted.

The pad PAD may be provided around an edge of the substrate 110. A plurality of data lines 171 may extend to the peripheral area PA and may be connected to the pad PAD.

The display device according to an embodiment of the present inventive concept may further include a flexible printed circuit film, a driving circuit chip, and a printed circuit board (PCB) connected to the pad PAD of the display panel 1000. A plurality of data lines 171 may receive data signals through the pad PAD.

A detailed configuration of a display device according to an embodiment of the present inventive concept will now be described with reference to FIG. 1, FIG. 2, and FIG. 3 to FIG. 6.

Figure 3:
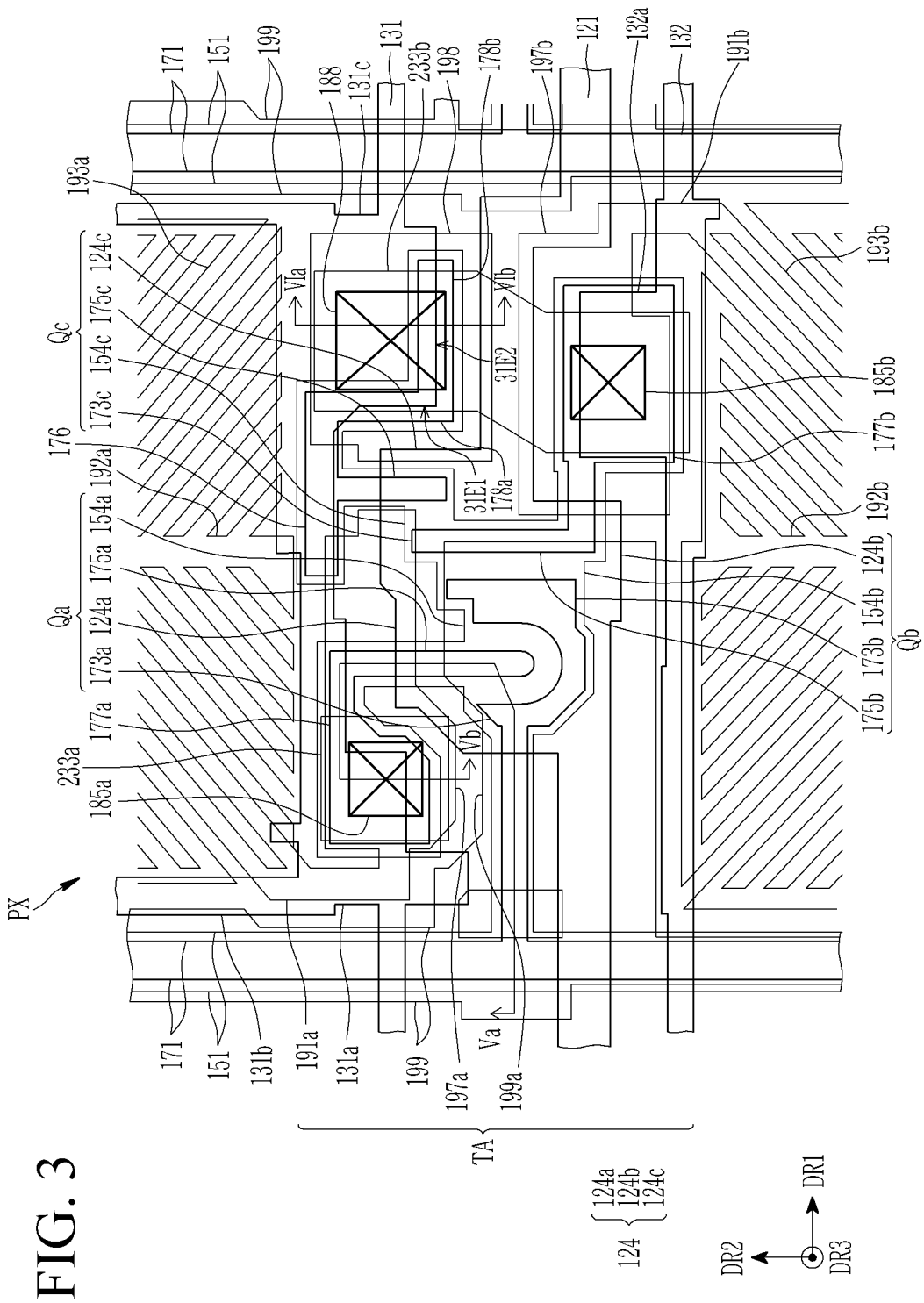
FIG. 3 shows a plan view of one pixel of a display device according to an embodiment of the present inventive concept.
Figure 4:
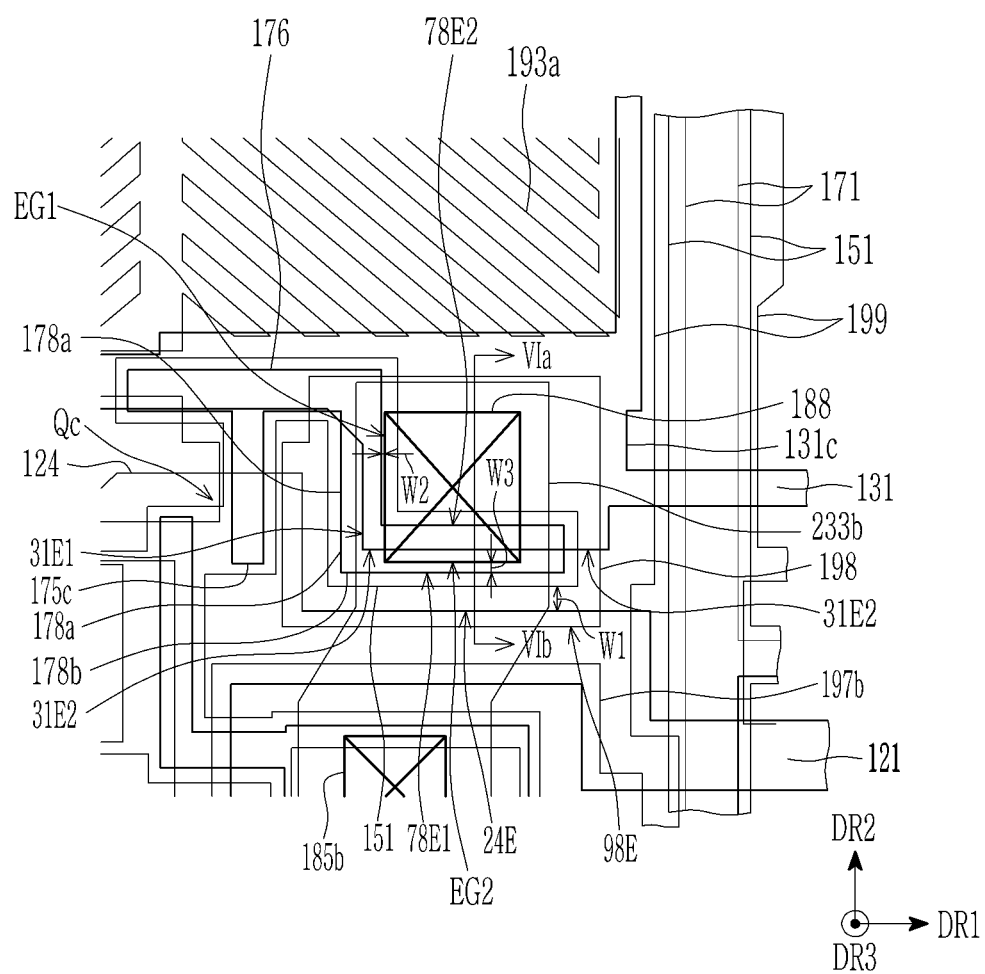
FIG. 4 shows a magnified region of a pixel shown in FIG. 3.
Figure 5:
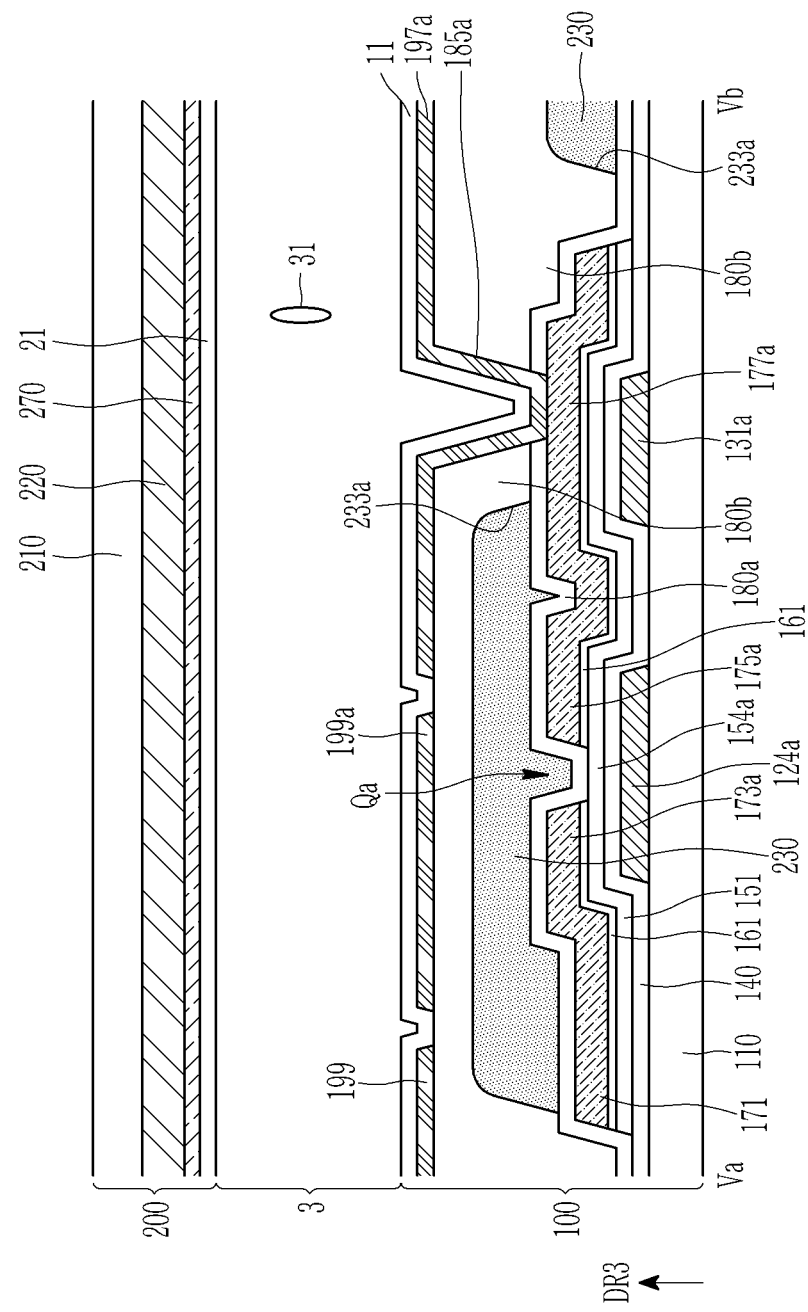
FIG. 5 shows a cross-sectional view of a display device shown in FIG. 3 with respect to a line Va-Vb.
Figure 6:
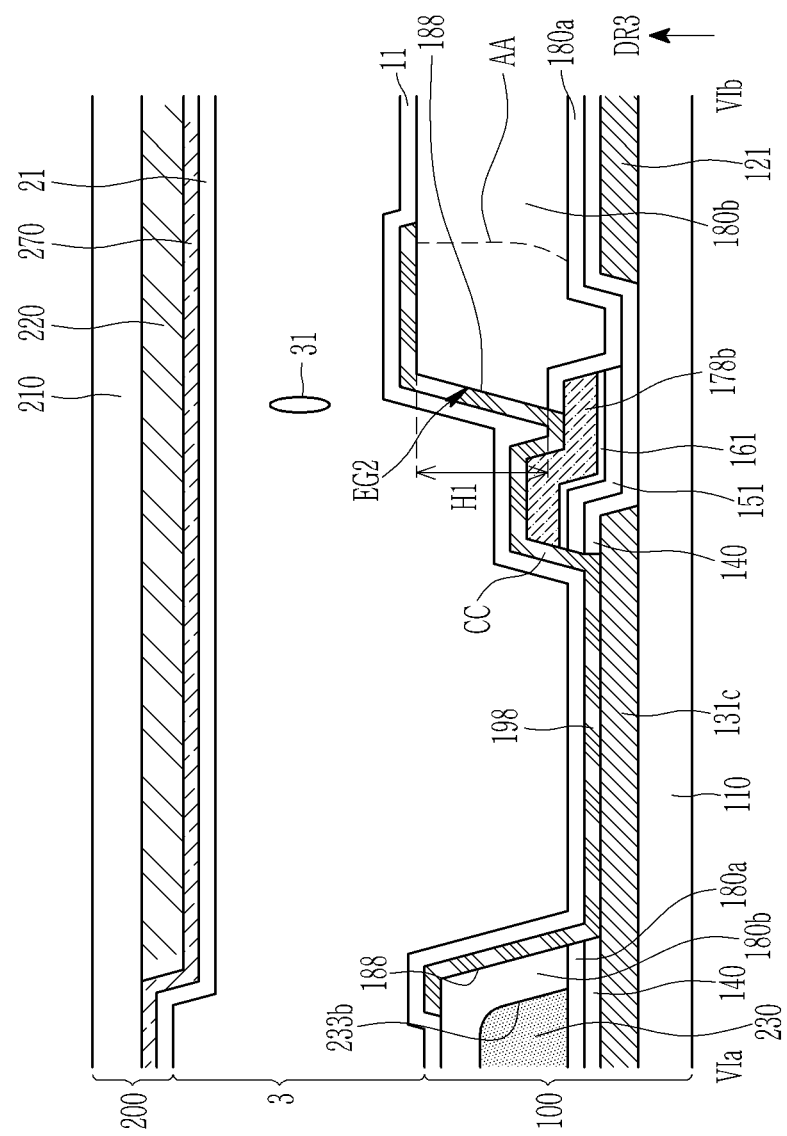
FIG. 6 shows a cross-sectional view of a display device shown in FIG. 3 and FIG. 4 with respect to a line VIa-VIb.

FIG. 3 shows a plan view of one pixel of a display device according to an embodiment of the present inventive concept, FIG. 4 shows a magnified region of a pixel shown in FIG. 3, FIG. 5 shows a cross-sectional view of a display device shown in FIG. 3 with respect to a line Va-Vb, and FIG. 6 shows a cross-sectional view of a display device shown in FIG. 3 and FIG. 4 with respect to a line VIa-VIb.

The display device according to an embodiment of the present inventive concept is a liquid crystal display, and referring to FIG. 5 and FIG. 6, it may include a first display panel 100, a second display panel 200, and a liquid crystal layer 3 provided between the display panels 100 and 200.

Regarding the first display panel 100, a plurality of gate lines 121 which are conductors, as well as reference voltage lines 131 and 132, may be provided on the insulating substrate 110.

The gate line 121 may transmit a gate signal and may substantially extend in the first direction DR1. The gate line 121 may include a first gate electrode 124a, a second gate electrode 124b, and a third gate electrode 124c. The first gate electrode 124a, the second gate electrode 124b, and the third gate electrode 124c may be connected to each other and may be included in one expansion 124 of the gate line 121.

The expansion 124 may have a form protruding and/or expanding in the second direction DR2 from a portion at which the gate line 121 extends in parallel to the first direction DR1.

The reference voltage lines 131 and 132 may transmit the same voltage or different voltages. The reference voltage line 131 and the reference voltage line 132 may or may not be electrically connected to each other in the display area DA or the peripheral area PA. When the reference voltage line 131 and the reference voltage line 132 are not electrically connected to each other, the reference voltage line 131 and the reference voltage line 132 may independently receive voltages. The voltage transmitted by the reference voltage line 131 will be referred to as a reference voltage Vref.

The reference voltage lines 131 and 132 may include a portion separated from the gate line 121 and extending substantially in parallel to the gate line 121. The reference voltage line 131 and the reference voltage line 132 may be provided on different sides of the gate line 121, but their position is not limited thereto, and the reference voltage line 131 and the reference voltage line 132 may be provided on the same side of the gate line 121 instead.

The reference voltage line 131 may include an expansion 131c. The expansion 131c may have a form protruding and/or expanding in the second direction DR2 from a portion in which the reference voltage line 131 extends in parallel to the first direction DR1. The expansion 131c may neighbor the gate line 121 on the substrate 110. The expansion 131c may overlap the pixel circuit portion TA.

Referring to FIG. 3 and FIG. 4, the expansion 131c of the reference voltage line 131 may have a first edge 31E1 extending in the second direction DR2 and a second edge 31E2 extending in the first direction DR1. The first edge 31E1 and the second edge 31E2 may contact each other at one point, e.g. a corner where the first edge 31E1 and the second edge 31E2 meet. The second edge 31E2 of the expansion 131c of the reference voltage line 131 may be an edge provided toward the gate line 121 and may face the gate line 121. That is, according to the present embodiment, the second edge 31E2 may be an edge on a side facing toward and closest to the expansion 177b of the second drain electrode 175b.

Referring to FIG. 3, the reference voltage line 131 may further include an expansion 131a separated from the expansion 131c. The expansion 131a may overlap the pixel circuit portion TA.

The reference voltage line 131 may further include an extension 131b extending in the second direction DR2.

The reference voltage line 132 may include an expansion 132a. The expansion 132a may overlap the pixel circuit portion TA.

Referring to FIG. 5 and FIG. 6, a gate insulating layer 140 may be provided on the gate line 121 and the reference voltage lines 131 and 132 in a cross-sectional view. The gate insulating layer 140 may include an insulating material such as a silicon nitride (SiNx), a silicon oxide (SiOx), or a silicon oxynitride (SiON).

A semiconductor 151 including a first semiconductor portion 154a, a second semiconductor portion 154b, and a third semiconductor portion 154c is provided on the gate insulating layer 140. The first semiconductor portion 154a is provided on the first gate electrode 124a to overlap the first gate electrode 124a, the second semiconductor portion 154b is provided on the second gate electrode 124b to overlap the second gate electrode 124b, and the third semiconductor portion 154c is provided on the third gate electrode 124c to overlap the third gate electrode 124c. The first semiconductor portion 154a, the second semiconductor portion 154b, and the third semiconductor portion 154c may be connected to each other, and the second semiconductor portion 154b may be provided between the first semiconductor portion 154a and the third semiconductor portion 154c in a plan view.

The semiconductor 151 may include amorphous silicon, polycrystalline silicon, and/or a metal oxide.

An ohmic contact 161 may be provided on the semiconductor 151.

A data conductive layer including a plurality of data lines 171 and a plurality of conductors including a first source electrode 173a, a second source electrode 173b, a third source electrode 173c, a first drain electrode 175a, a second drain electrode 175b, and a third drain electrode 175c is provided on the ohmic contact 161.

The data lines 171 may extend in the second direction DR2 and may transmit data signals.

The first source electrode 173a and the second source electrode 173b are connected to each other, and the first source electrode 173a is connected to one data line 171.

Referring to FIG. 3, the first drain electrode 175a may include a first end portion facing the first source electrode 173a and surrounded by the first source electrode 173a, and an expansion 177a provided on a second end portion. The first source electrode 173a and the first drain electrode 175a may face each other on the first semiconductor portion 154a.

The second drain electrode 175b may include an expansion 177b facing the second source electrode 173b and provided on a first end portion, and a second end portion extending in parallel to the second source electrode 173b. At least part of the second drain electrode 175b may be the third source electrode 173c. The second source electrode 173b and the second drain electrode 175b may face each other on the second semiconductor portion 154b.

The third drain electrode 175c may include a first end portion facing the third source electrode 173c, a connector 176 connected to the first end portion, and bent portions 178a and 178b connected to the connector 176.

The first end portion of the third drain electrode 175c facing the third source electrode 173c may extend in the second direction DR2. The third source electrode 173c and the third drain electrode 175c may face each other on the third semiconductor portion 154c.

The connector 176 may extend in the first direction DR1.

The bent portions 178a and 178b may include a first extension 178a and a second extension 178b extending in different directions from each other. The first extension 178a may be connected to the connector 176 and may extend in the second direction DR2. The second extension 178b may be connected to the first extension 178a and may extend in the first direction DR1.

The second extension 178b may be connected to the end portion that is provided closer to the gate line 121 or the expansion 177b of the second drain electrode 175b from among the respective end portions of the first extension 178a.

The first extension 178a may extend substantially parallel to the first edge 31E1 of the expansion 131c of the reference voltage line 131, and they may overlap each other.

That is, the first edge 31E1 of the expansion 131c of the reference voltage line 131 may be provided between two parallel edges of the first extension 178a or it may overlap one of the two edges of the first extension 178a that are parallel to each other. Alternatively, in another embodiment, the first extension 178a may not overlap the first edge 31E1 of the expansion 131c of the reference voltage line 131, and they may be separated from each other.

The second extension 178b may extend substantially parallel to the second edge 31E2 of the expansion 131c of the reference voltage line 131, and they may overlap each other. That is, the second edge 31E2 of the expansion 131c of the reference voltage line 131 may be provided between two parallel edges of the second extension 178b, or it may overlap one of the two parallel edges of the second extension 178b.

The third drain electrode 175c includes the second extension 178b provided toward the expansion 177b of the second drain electrode 175b from among the edges of the expansion 131c of the reference voltage line 131 and overlapping the second edge 31E2 extending in the first direction DR1, and the shape of a remaining portion thereof may be changeable in other ways.

In a plan view, the expansion 177a of the first drain electrode 175a may overlap the expansion 131a of the reference voltage line 131, the expansion 177b of the second drain electrode 175b may overlap the expansion 132a of the reference voltage line 132, and the bent portions 178a and 178b may overlap the expansion 131c of the reference voltage line 131.

In a plan view, the expansion 177a of the first drain electrode 175a and the expansion 177b of the second drain electrode 175b may be provided on respective sides of the gate line 121, and they are not limited thereto. The bent portions 178a and 178b of the third drain electrode 175c may be provided on the opposite side to the expansion 177b of the second drain electrode 175b with respect to the gate line 121.

Referring to FIG. 4, in a plan view, a gap W1 between a bottom edge of the semiconductor 151 overlapping the second extension 178b and a top edge 24E of the gate line 121 neighboring the same may be greater than 0. Furthermore, a bottom edge 78E1 of the second extension 178b may be separated from the top edge 24E of the gate line 121 neighboring the same.

At least one of the gate line 121, the reference voltage lines 131 and 132, the data line 171, the first source electrode 173a, the second source electrode 173b, the third source electrode 173c, the first drain electrode 175a, the second drain electrode 175b, and the third drain electrode 175c may include at least one of copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), and an alloy thereof.

The data conductive layer including the data line 171, the first source electrode 173a, the second source electrode 173b, the third source electrode 173c, the first drain electrode 175a, the second drain electrode 175b, and the third drain electrode 175c may have substantially the same plan view as the ohmic contact 161. The plan views of the data conductive layer and the semiconductor 151 may be substantially identical to each other at a portion excluding a space between the first source electrode 173a and the first drain electrode 175a, a space between the second source electrode 173b and the second drain electrode 175b, and a space between the third source electrode 173c and the third drain electrode 175c. As shown in FIG. 3 and FIG. 4, a planar area of the semiconductor 151 may be slightly greater than a planar area of the data conductive layer.

The first gate electrode 124a, the first source electrode 173a, the first semiconductor portion 154a, and the first drain electrode 175a make up a first transistor Qa, the second gate electrode 124b, the second source electrode 173b, the second semiconductor portion 154b, and the second drain electrode 175b make up a second transistor Qb and the third gate electrode 124c, the third source electrode 173c, the third semiconductor portion 154c, and the third drain electrode 175c make up a third transistor Qc.

Channels of the first transistor Qa, the second transistor Qb, and the third transistor Qc may be formed on the first, second, and third semiconductor portions 154a, 154b, and 154c provided between the first, second, and third source electrodes 173a, 173b, and 173c and the first, second, and third drain electrodes 175a, 175b, and 175c.

A first insulating layer 180a is provided on the data conductive layer. The first insulating layer 180a may include an organic insulating material or an inorganic insulating material.

A color filter 230 may be provided on the first insulating layer 180a. The color filter 230 may display one of the three primary colors of red, green, and blue or the four primary colors. One group of color filters displaying different primary colors may be repeatedly disposed in the first direction DR1 in a plan view.

As described above, the color filter 230 may have openings 233a and 233b provided in the pixel circuit portion TA. Referring to FIG. 3, in a plan view, the opening 233a may overlap the expansion 177a of the first drain electrode 175a, and the opening 233b may overlap the expansion 177b of the second drain electrode 175b and the bent portions 178a and 178b of the third drain electrode 175c.

As shown in FIG. 3 and FIG. 4, when the expansion 177b of the second drain electrode 175b is separated from the bent portions 178a and 178b of the third drain electrode 175c in the second direction DR2, the opening 233b of the color filter 230 may substantially extend in the second direction DR2. Furthermore, a portion curved in a direction that is inclined in the first direction DR1 and the second direction DR2 may be provided between a portion overlapping the expansion 177b of the second drain electrode 175b and a portion overlapping the bent portions 178a and 178b of the third drain electrode 175c in the opening 233b of the color filter 230.

The second extension 178b and the expansion 131c of the reference voltage line 131 overlapping each other may also overlap the opening 233b of the color filter 230.

A second insulating layer 180b may be provided on the color filter 230. The second insulating layer 180b may include an inorganic insulating material and/or an organic insulating material, and in one particular example, it may include an organic insulating material and may form a substantially flat upper side. The second insulating layer 180b functions as an overcoat for the color filter 230 to prevent the color filter 230 from being exposed, and also prevent impurities such as a pigment from being input to the liquid crystal layer 3.

The first insulating layer 180a and the second insulating layer 180b may have an opening 185a provided on the expansion 177a of the first drain electrode 175a, an opening 185b provided on the expansion 177b of the second drain electrode 175b, and an opening 188 provided on the bent portions 178a and 178b of the third drain electrode 175c and an expansion 131c of the reference voltage line 131. For example, the first insulating layer 180a and the second insulating layer 180b may collectively share the opening 185a.

In a plan view, the opening 185b and the opening 188 that are relatively close to each other may overlap one opening 233b of the color filter 230. In other words, the openings 185b and 188 of the first insulating layer 180a and the second insulating layer 180b may be provided in the opening 233b of the color filter 230. By forming one opening 233b in the color filter 230 corresponding to a plurality of openings 185b and 188 that are provided to be close to each other, a drawback that is generated when a plurality of openings corresponding to the openings 185b and 188 are formed in the color filter 230 may be prevented.

In a plan view, the opening 188 and the opening 185b may be separately disposed from each other in a direction that is different from the first direction DR1. For example, as shown in the plan view of FIG. 3, the opening 188 and the opening 185b may be separately disposed in the second direction DR2 or in a direction forming an acute angle that is equal to or less than about 45 degrees with the second direction DR2.

A plurality of conductors including a pixel electrode including a first sub-pixel electrode 191a and a second sub-pixel electrode 191b, a shield electrode 199, and a connecting member 198 may be provided on the second insulating layer 180b.

The first sub-pixel electrode 191a may be provided on a first side and the second sub-pixel electrode 191b may be provided on a second side with respect to the gate line 121 or the pixel circuit portion TA for each pixel PX. FIG. 3 and FIG. 4 show an example in which the first sub-pixel electrode 191a is provided above the gate line 121 and the second sub-pixel electrode 191b is provided below the gate line 121.

The first sub-pixel electrode 191a may include a stem 192a, a plurality of branches 193a extending in an oblique direction leaning in the first direction DR1 and the second direction DR2 from the stem 192a, and a contact portion 197a. The contact portion 197a is electrically connected to the expansion 177a of the first drain electrode 175a through the opening 185a.

The second sub-pixel electrode 191b may include a stem 192b, a plurality of branches 193b extending in an oblique direction leaning in the first direction DR1 and the second direction DR2 from the stem 192b, and a contact portion 197b. The contact portion 197b is electrically connected to the expansion 177b of the second drain electrode 175b through the opening 185b.

Referring to FIG. 4, a gap W2 between a left edge EG1 that is nearest a first extension 178a of the bent portions 178a and 178b and a right edge of the first extension 178a from among the edges of the opening 188 may be equal to or greater than 0. That is, the opening 188 may not overlap the first extension 178a. Alternatively, in another embodiment, the opening 188 may overlap the first extension 178a, and in this case, the left edge EG1 of the opening 188 may not digress to a left side further from the left edge of the first extension 178a.

A gap W3 between the bottom edge EG2 that is the nearest the bottom edge 78E1 of the second extension 178b of the bent portions 178a and 178b and the bottom edge 78E1 of the second extension 178b from among the edges of the opening 188 may be equal to or greater than 0. Furthermore, in a plan view, the bottom edge EG2 of the opening 188 may be provided below a top edge 78E2 of the second extension 178b. That is, the opening 188 may overlap the second extension 178b. Alternatively, the bottom edge EG2 of the opening 188 may be provided below the bottom edge 78E1 of the second extension 178b, and may not be provided below the bottom edge of the semiconductor 151 overlapping the second extension 178b.

The shield electrode 199 may include a portion substantially extending in the second direction DR2 and overlapping the data line 171. The shield electrode 199 may be provided between two pixels PX neighboring in the first direction DR1, may prevent capacitive coupling between the data line 171 and the first and second sub-pixel electrodes 191a and 191b by shielding an electric field from the data line 171, and may furthermore prevent leakage of light.

The shield electrode 199 may further include a shield 199a provided on the pixel circuit portion TA and overlapping the first and second transistors Qa and Qb.

The connecting member 198 contacts the bent portions 178a and 178b of the third drain electrode 175c and the expansion 131c of the reference voltage line 131 through the opening 188 and is electrically connected thereto. Accordingly, the bent portions 178a and 178b of the third drain electrode 175c may be electrically connected to the expansion 131c of the reference voltage line 131 through the connecting member 198 which is conductive, and may receive a reference voltage through this connection.

In a plan view, the connecting member 198 may overlap part of the top edge 24E of the gate line 121. Alternatively, in another embodiment, the connecting member 198 may not overlap the gate line 121. In this case, a bottom edge 98E of the connecting member 198 may be provided between the top edge 24E of the gate line 121 and the bent portions 178a and 178b of the third drain electrode 175c.

A portion of the connecting member 198 contacting the second extension 178b of the third drain electrode 175c may be provided closer to the gate line 121 or the opening 185b than a portion of the connecting member 198 contacting the expansion 131c of the reference voltage line 131.

The pixel electrode, the shield electrode 199, and the connecting member 198 may include a transparent conductive material such as an indium-tin oxide (ITO), an indium-zinc oxide (IZO), and/or a metal thin film.

An alignment layer 11 may be provided on the pixel electrode, the shield electrode 199, the connecting member 198, and the second insulating layer 180b.

The alignment layer 11 may be a vertical alignment layer.

Regarding the second display panel 200, a light blocking member 220 may be provided below an insulating substrate 210. Here, a lower side of the substrate 210 signifies a side provided toward the liquid crystal layer 3 with respect to the substrate 210. The light blocking member 220 may overlap most of the pixel circuit portion TA in a plan view. The light blocking member 220 may be disposed between the first sub-pixel electrode 191a and the second sub-pixel electrode 191b.

According to another embodiment, the light blocking member 220 may be provided on the first display panel 100 rather than on the second display panel 200.

A common electrode 270 may be provided below the light blocking member 220. The common electrode 270 may be continuously formed below a side of the substrate 210. The common electrode 270 may be a whole plate without any removed portions, such as a slit. The common electrode 270 may transmit a common voltage with of a constant quantity.

The reference voltage transmitted by the reference voltage line 131 may be the same as or different from the common voltage transmitted by the common electrode 270.

The common electrode 270 may include a transparent conductive material such as an ITO, an IZO, and/or a metal thin film.

An alignment layer 21 may be provided below the common electrode 270. The alignment layer 21 may be a vertical alignment layer.

The liquid crystal layer 3 includes a plurality of liquid crystal molecules 31. The liquid crystal molecules 31 may have negative dielectric anisotropy, and they may be aligned in a substantially vertical direction with respect to the substrates 110 and 210 while no electric field is generated to the liquid crystal layer 3. The liquid crystal molecules 31 may form a pre-tilt in a predetermined direction when no electric field is generated to the liquid crystal layer 3.

Referring to FIG. 3, FIG. 4, and FIG. 6, as described above, the bottom edge EG2 of the opening 188 extending in parallel to the second extension 178b may overlap the second extension 178b and/or the semiconductor 151 overlapping the second extension 178b. That is, the bottom edge EG2 of the opening 188 may be provided between two edges of the second extension 178b that face each other, and/or may be provided to overlap a portion of the semiconductor 151 that overlaps and is parallel to the second extension 178b. Accordingly, a height H1 of the edge portion AA (e.g., a maximum height of the edge portion AA) of the second insulating layer 180b in a third direction DR3, provided near the edge EG2 of the opening 188 of the first insulating layer 180a and the second insulating layer 180b, may be relatively low in FIG. 6. In other words, a thickness in the third direction DR3 of the edge portion AA of the second insulating layer 180b provided near the edge EG2 of the opening 188 is less compared to at least some other portions of the second insulating layer 180b, thereby reducing a peeling possibility of the edge portion AA.

When the edge portion AA of the second insulating layer 180b is peeled off, the first insulating layer 180a and the gate insulating layer 140 provided below the second insulating layer fall apart, the gate line 121 provided to the bottom thereof is revealed, and the connecting member 198 may contact the gate line 121. The gate line 121 and the reference voltage line 131 may thereby be short-circuited to each other through the connecting member 198, potentially causing defects in the display device. However, the defects may be prevented according to an embodiment of the present inventive concept.

Particularly, when the color filter 230 provided on a layer below the second insulating layer 180b includes an opening 233b corresponding to the two openings 188 and 185b according to an embodiment of the present inventive concept, the color filter 230 is not provided between the openings 188 and 185b. Since none of the color filter 230 is provided below the second insulating layer 180b remaining between the two openings 188 and 185b, a thickness of the second insulating layer 180b in the third direction DR3 may be larger compared to if some of the color filter 230 were provided below that portion of the second insulating layer 180b. According to the present embodiment, when the edge EG2 facing the opening 185b from among the edges of the opening 188 is provided on part of the third drain electrode 175c, that is, the bent portions 178a and 178b, the thickness of the second insulating layer 180b provided near the edge EG2 of the opening 188 is reduced, and a risk of peeling of the second insulating layer 180b is reduced.

When an opening 188 is formed in the first and second insulating layers 180a and 180b in order to electrically connect two conductors provided on different conductive layers such as the expansion 131c of the reference voltage line 131 and the bent portions 178a and 178b of the third drain electrode 175c, the bent portions 178a and 178b of the third drain electrode 175c provided nearer the second insulating layer 180b in a cross-sectional view, particularly, the second extension 178b, is disposed to overlap the second edge 31E2 facing toward and closest to the opening 185b from among the edges of the expansion 131c of the reference voltage line 131. Here, the opening 185b may be provided in the opening 233b of the same color filter 230 together with the opening 188, and there may be no color filter 230 between the openings 185b and 188. According to this configuration, the risk of peeling may be reduced due to the reduced thickness of the second insulating layer 180b between the two openings 188 and 185b of the first and second insulating layers 180a and 180b provided in one opening 233b of the color filter 230.

Effects of the present inventive concept will now be described with reference to FIG. 7 and FIG. 8, and a comparative example, together with FIG. 3 to FIG. 6.

Figure 7:
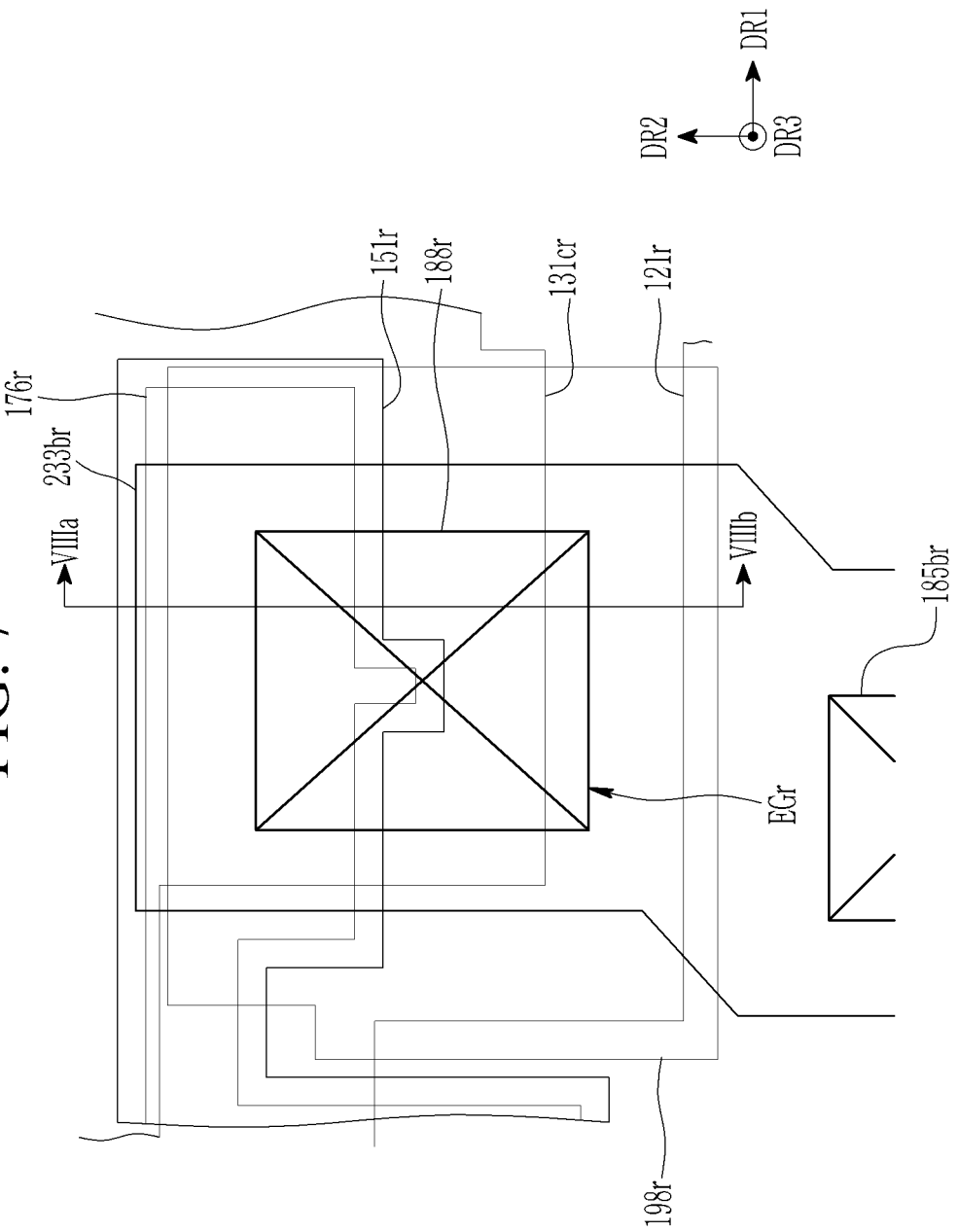
FIG. 7 shows a plan view of part of a pixel of a display device according to a comparative example.
Figure 8:
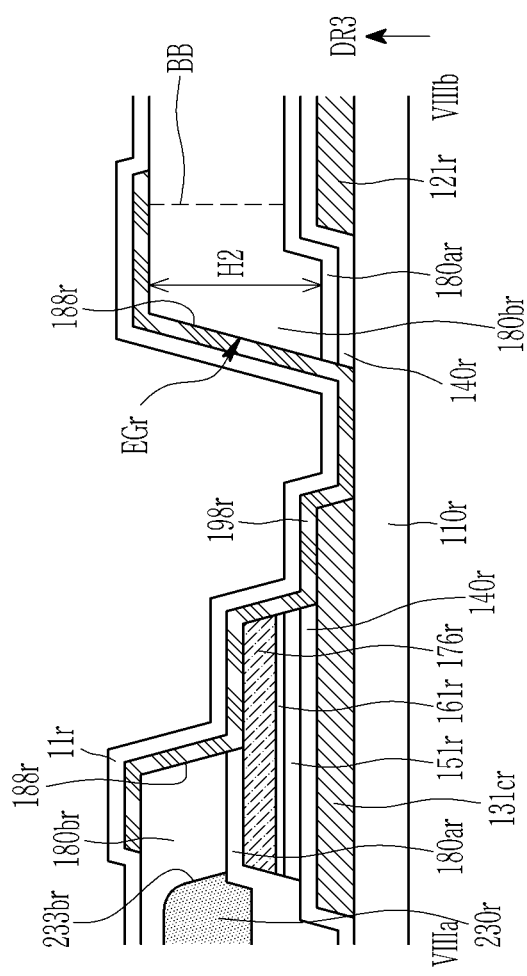
FIG. 8 shows a cross-sectional view of a display device shown in FIG. 7 with respect to a line VIIIa-VIIIb.

FIG. 7 shows a plan view of part of a pixel of a display device according to a comparative example, and FIG. 8 shows a cross-sectional view of a display device shown in FIG. 7 with respect to a line VIIIa-VIIIb.

The display device according to a comparative example mostly corresponds to the display device according to an embodiment of the present inventive concept, and differences will be generally described.

Referring to FIG. 7 and FIG. 8, the display device according to a comparative example includes a gate line 121r and a reference voltage line provided on a substrate 110r, a gate insulating layer 140r provided on the gate line 121r and the reference voltage line, a semiconductor 151r provided on the gate insulating layer 140r, and an ohmic contact 161r.

A data conductive layer including a data line, first, second, and third source electrodes, and first, second, and third drain electrodes may be provided on the ohmic contact 161r. The third drain electrode includes a first end portion facing the third source electrode, and a connector 176r connected to the first end portion and configuring a second end portion, and it does not include bent portions 178a and 178b according to an embodiment of the present inventive concept.

Referring to FIG. 7, the connector 176r may extend in the first direction DR1. The connector 176r may overlap an expansion 131cr of the reference voltage line and may overlap an upper portion of the expansion 131cr.

A first insulating layer 180ar is provided on the connector 176r, and a color filter 230r is provided on the first insulating layer 180ar. The color filter 230r may have an opening 233br overlapping the connector 176r of the third drain electrode and the expansion 131cr of the reference voltage line.

A second insulating layer 180br is provided on the color filter 230r. The first insulating layer 180ar and the second insulating layer 180br may include an opening 188r provided on the connector 176r of the third drain electrode and the expansion 131cr of the reference voltage line, and an opening 185br separated from the opening 188r. The opening 188r and the opening 185br may be provided in one opening 233br of the color filter 230r.

The bottom edge EGr facing the gate line 121r from among the edges of the opening 188r may be provided between the expansion 131cr of the reference voltage line and the gate line 121r, and it may be provided on the expansion 131cr of the reference voltage line and may overlap the expansion 131cr as shown in FIG. 7 and FIG. 8.

A pixel electrode and a connecting member 198r are provided on the second insulating layer 180br. The connecting member 198r contacts the connector 176r of the third drain electrode and the expansion 131cr of the reference voltage line through the opening 188r, and is electrically connected to the connector 176r of the third drain electrode and the expansion 131cr.

An alignment layer 11r may be provided on the connecting member 198r.

Referring to FIG. 7 and FIG. 8, a data conductive layer such as the connector 176r of the third drain electrode is not provided between the bottom edge EGr facing the gate line 121r from among the edges of the opening 188r and the substrate 110r, and is provided in the opening 233br of the color filter 230r, so no color filter 230r exists. Therefore, as shown in FIG. 8, the height H2 in the third direction DR3 of the edge portion BB (e.g., a maximum height of the edge portion BB) of the second insulating layer 180br provided near the edge EGr of the opening 188r of the first insulating layer 180ar and the second insulating layer 180br is relatively large, and the thickness of the edge portion BB in the third direction DR3 is relatively large, so the risk of peeling of the edge portion BB of the second insulating layer 180br is very high.

As the edge portion BB of the second insulating layer 180br is peeled off, the first insulating layer 180ar and the gate insulating layer 140r provided below the same are peeled off, and the gate line 121r is exposed, so the connecting member 198r may contact the gate line 121r. Therefore, the gate line 121r and the expansion 131cr of the reference voltage line may be short-circuited through the connecting member 198r, and defects may be generated.

In comparison to the comparative example, the above-described display device according to an embodiment of the present inventive concept is provided to overlap the second extension 178b of the third drain electrode 175c provided on the bottom edge EG2 facing the gate line 121 from among the edges of the opening 188 or a portion of the semiconductor 151 overlapping the second extension 178b and provided in parallel to the same, as shown in FIG. 3 to FIG. 6. Therefore, the height H1 or the thickness in the third direction DR3 of the second insulating layer 180b provided near the edge EG2 of the opening 188 of the first and second insulating layers 180a and 180b is very small in comparison to the comparative example, so the risk that the edge portion AA of the second insulating layer 180b provided near the edge EG2 of the opening 188 is peeled off is reduced. Accordingly, the risk that the gate line 121 may contact the connecting member 198 is lessened, preventing short-circuits between the gate line 121 and the reference voltage line 131.

Particularly, when the color filter 230 has one opening 233b corresponding to two openings 188 and 185b provided close to each other, no color filter 230 is provided between the edge EG2 of the opening 188 of the second insulating layer 180b and the substrate 110, the second extension 178b of the third drain electrode 175c, and the semiconductor 151 and the ohmic contact 161 provided below the same are provided between the edge EG2 of the opening 188 of the second insulating layer 180b and the substrate 110, so the thickness in the third direction DR3 of the edge portion AA of the second insulating layer 180b provided near the opening 188 is substantially lowered compared to the thickness in the third direction DR3 of the edge portion BB of the second insulating layer 180br according to a comparative example.

Referring to FIG. 6, an inclined portion CC between a portion provided on the second extension 178b from among the connecting member 198 and a portion not overlapping the second extension 178b but provided on the expansion 131c of the reference voltage line 131 may be at least partly cut off by a high step.

A circuit configuration of a pixel of a display device according to an embodiment of the present inventive concept will now be described with reference to FIG. 3 to FIG. 6 and FIG. 9.

Figure 9:
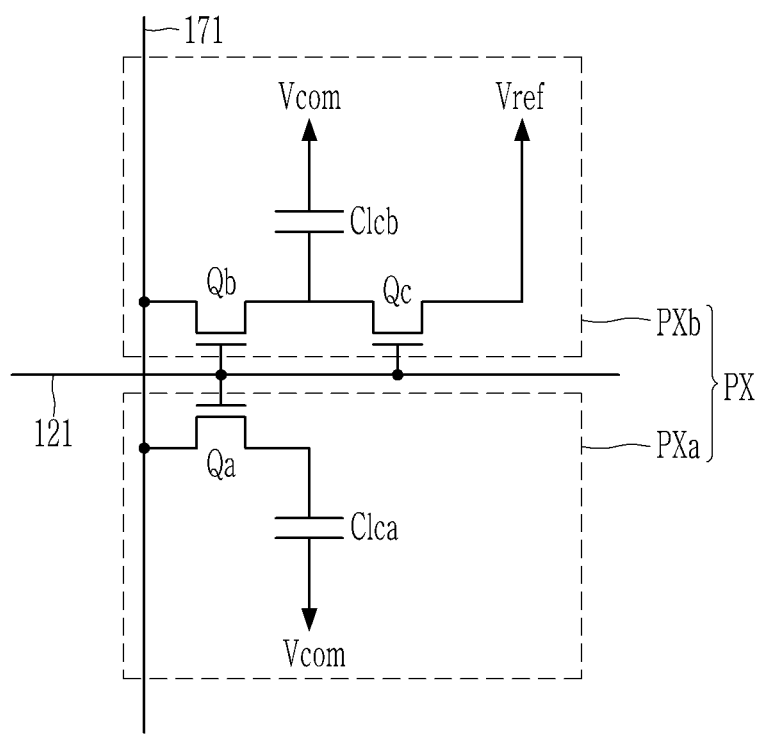
FIG. 9 shows an equivalent circuit diagram of a pixel of a display device according to an embodiment of the present inventive concept.

FIG. 9 shows an equivalent circuit diagram of a pixel of a display device according to an embodiment of the present inventive concept.

One pixel PX included by a display device according to an embodiment of the present inventive concept may include a first subpixel PXa and a second subpixel PXb. The first subpixel PXa may include a first transistor Qa connected to a data line 171 and a gate line 121, and a first liquid crystal capacitor Clca connected to the first transistor Qa. The second subpixel PXb includes a second transistor Qb and a third transistor Qc connected to one data line 171 and one gate line 121, and a second liquid crystal capacitor Clcb connected thereto.

The first transistor Qa may be controlled by a gate signal transmitted by the gate line 121, and may transmit a data voltage transmitted by the data line 171 to the first liquid crystal capacitor Clca. For example, the first liquid crystal capacitor Clca may include the above-noted first sub-pixel electrode 191a and the common electrode 270 as two terminals, and the common electrode 270 may transmit a common voltage Vcom.

The second transistor Qb is controlled by a gate signal transmitted by the gate line 121, and may transmit a data voltage transmitted by the data line 171 to the second liquid crystal capacitor Clcb. For example, the second liquid crystal capacitor Clcb may include the above-noted second sub-pixel electrode 191b and the common electrode 270 as two terminals, and the common electrode 270 may transmit a common voltage Vcom.

The third transistor Qc includes a gate electrode connected to the same gate line 121 as the first transistor Qa, a source electrode connected to a drain electrode of the second transistor Qb, and a drain electrode connected to the reference voltage Vref. The third transistor Qc is controlled by a gate signal transmitted by the gate line 121, and when the third transistor Qc and the second transistor Qb are turned on, the data voltage transmitted by the data line 171 may be divided by the second transistor Qb and the third transistor Qc and may be transmitted to the second liquid crystal capacitor Clcb. The reference voltage Vref may be a predetermined voltage. The above-noted reference voltage line 131 according to an embodiment may transmit a reference voltage Vref.

The first subpixel PXa and the second subpixel PXb may display an image according to different gamma curves for one input image signal, and may display an image according to the same gamma curve. Here, the gamma curve signifies a curve for showing changes of luminance or transmittance of a gray of an input image signal.

The gamma curve followed by the second subpixel PXb may be controlled by controlling resistance ratios of the third transistor Qc and second transistor Qb, and the reference voltage Vref. A charging voltage of the second liquid crystal capacitor Clcb is controlled by controlling the third transistor Qc and the reference voltage Vref, so luminance of the subpixels PXa and PXb may be changeable, and when the charged voltage of the first liquid crystal capacitor Clca and the second liquid crystal capacitor Clcb is appropriately controlled, lateral visibility of the display device may be improved.

The first liquid crystal capacitor Clca of the first subpixel PXa may correspond to the above-noted first display unit DP1, and the second liquid crystal capacitor Clcb of the second subpixel PXb may correspond to the above-noted second display unit DP2.

A display device according to another embodiment of the present inventive concept will now be described with reference to FIG. 3 to FIG. 6, FIG. 10, and FIG. 11

Figure 10:
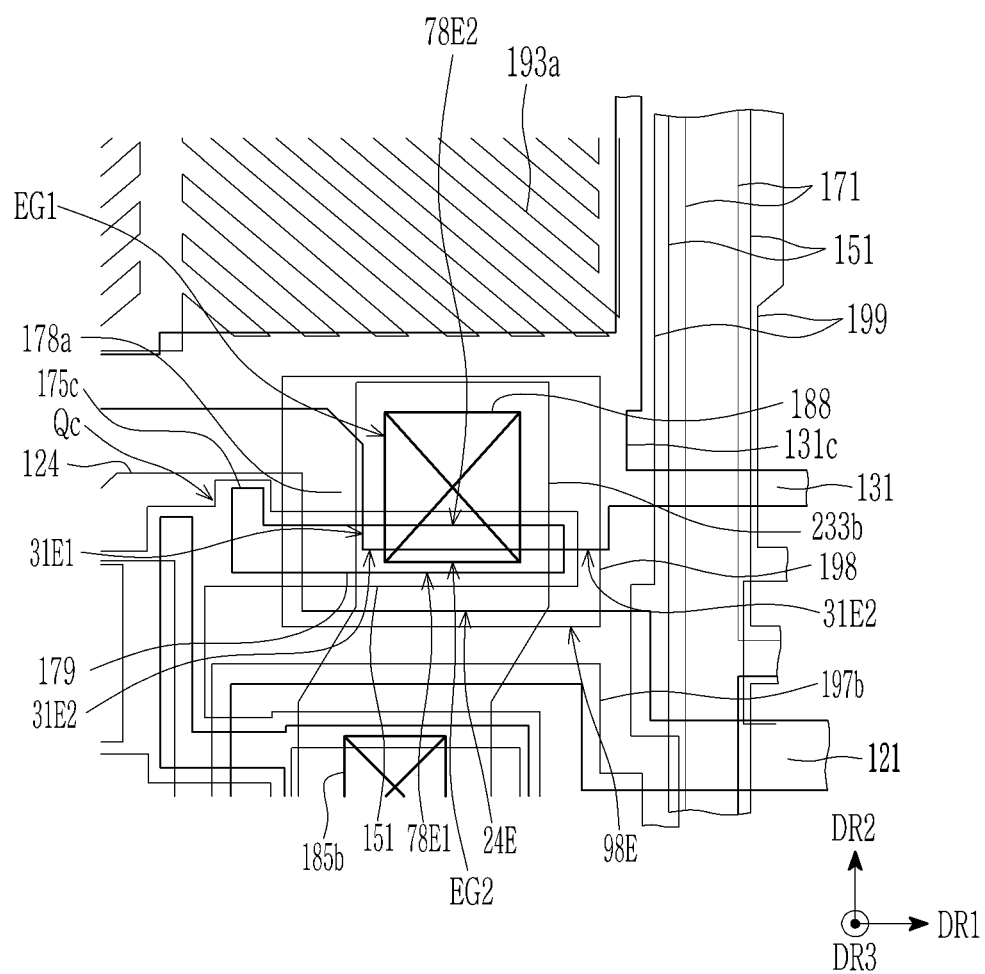
FIG. 10 shows a plan view of a predetermined region of a pixel of a display device according to an embodiment of the present inventive concept.
Figure 11:
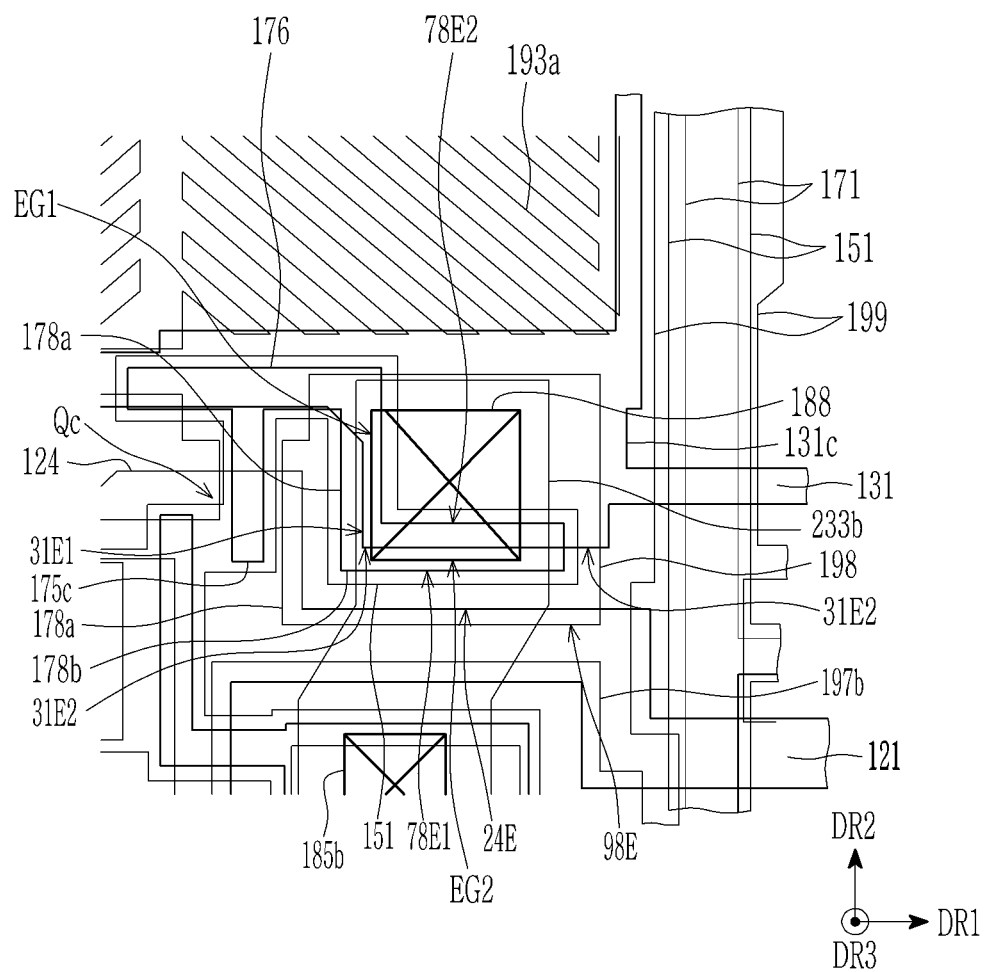
FIG. 11 shows a plan view of a predetermined region of a pixel of a display device according to an embodiment of the present inventive concept.

FIG. 10 and FIG. 11 show plan views of a predetermined region of a pixel of a display device according to an embodiment of the present inventive concept.

Referring to FIG. 10, the display device according to the present embodiment mostly corresponds to the display device according to an embodiment described with reference to FIG. 3 to FIG. 6, and a form of the third drain electrode 175c in a plan view may be different.

In detail, the third drain electrode 175c may include a first end portion facing the third source electrode 173c, and an extension 179 connected to the first end portion. The extension 179 may have a substantially identical characteristic to a characteristic of the second extension 178b according to the above-described embodiment.

That is, the extension 179 may extend in the first direction DR1 and may overlap the expansion 131c of the reference voltage line 131. Furthermore, the extension 179 may extend substantially in parallel to the second edge 31E2 of the expansion 131c of the reference voltage line 131, and the second edge 31E2 may overlap the extension 179.

The opening 188 overlaps the extension 179 in a plan view, and the bottom edge EG2 from among the edges of the opening 188 may be provided above the bottom edge of the extension 179 or the bottom edge of the semiconductor 151 overlapping the extension 179. Furthermore, in a plan view, the bottom edge EG2 of the opening 188 may be provided below the top edge of the extension 179.

In the configuration in which two neighboring openings 185b and 188 are provided in the opening 233b of the color filter 230, and the extension 179 of the third drain electrode 175c is disposed to overlap the second edge 31E2 facing toward and closest to the opening 185b from among the edges of the expansion 131c of the reference voltage line 131, the thickness of the portion of the second insulating layer 180b between two openings 188 and 185b of the first and second insulating layers 180a and 180b is reduced. That is, the extension 179 of the third drain electrode 175c, and the semiconductor 151 and the ohmic contact 161 provided below the same, are provided between the edge EG2 of the opening 188 of the second insulating layer 180b and the substrate 110, so the thickness in the third direction DR3 of the edge portion of the second insulating layer 180b provided near the opening 188 may be made smaller.

Referring to FIG. 11, the display device according to the present embodiment mostly corresponds to the display device according to an embodiment described with reference to FIG. 3 to FIG. 6, and a disposal of the opening 188 with respect to the bent portions 178a and 178b of the third drain electrode 175c may be different.

In detail, the left edge EG1 from among the edges of the opening 188 may overlap the first extension 178a. In a plan view, the left edge EG1 of the opening 188 may not digress to a left side further from the left edge of the first extension 178a or the semiconductor 151 overlapping the first extension 178a.

According to another embodiment of the present inventive concept, the color filter 230 of the display device may be an additional insulating layer such as the insulating layer 180b and it may not express colors, and the color filter 230 may be omitted.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a substrate;
a first conductor provided on the substrate;
a first insulating layer provided on the first conductor;
a second conductor provided on the first insulating layer;
a second insulating layer provided on the second conductor; and
a third conductor provided on the second insulating layer,
wherein the first conductor has a first edge and a second edge extending in different directions from each other,
the second conductor includes a first extension and a second extension extending in different directions from each other,
the first insulating layer and the second insulating layer collectively include a first opening provided on the first conductor and the second conductor,
the third conductor is electrically connected to the first conductor and the second conductor through the first opening,
the first extension extends in parallel to the first edge, and
the second extension extends in parallel to and overlaps with the second edge,
wherein the first extension and the second extension are continuously formed as one body.

2. The display device of claim 1, further comprising:
a fourth conductor provided on the substrate; and
a color filter provided on the substrate,
wherein the second insulating layer further includes a second opening provided on the fourth conductor,
the color filter includes a third opening, and
the first opening and the second opening are provided in the third opening.

3. The display device of claim 2, wherein
the second edge is an edge facing toward and closest to the second opening from among edges of the first conductor.

4. The display device of claim 3, wherein
the second extension and the second edge overlap the third opening.

5. The display device of claim 3, wherein
the first opening and the second opening are separately disposed in a first direction, and
the second edge extends in a second direction that is different from the first direction.

6. The display device of claim 3, further comprising
a signal line separated from the first conductor,
wherein the second extension is separated from the signal line.

7. The display device of claim 6, wherein
the signal line is provided in a same layer as the first conductor on the substrate.

8. The display device of claim 1, wherein
the first opening has a third edge, and
the third edge overlaps the second extension of the second conductor.

9. The display device of claim 8, wherein
the first opening further has a fourth edge connected to the third edge, and
the fourth edge overlaps the first extension.

10. The display device of claim 1, wherein
the second insulating layer includes an organic insulating material.

11. A display device comprising:
a substrate;
a first conductor provided on the substrate;
a first insulating layer provided on the first conductor;
a second conductor provided on the first insulating layer;
a second insulating layer provided on the second conductor;
a third conductor provided on the second insulating layer; and
a color filter provided on the substrate,
wherein the first insulating layer and the second insulating layer collectively include a first opening provided on the first conductor and the second conductor and a second opening separated from the first opening,
the color filter includes a third opening,
the first opening and the second opening are provided in the third opening,
the third conductor is electrically connected to the first conductor and the second conductor through the first opening,
the first conductor has a first edge, and
the second conductor includes a first extension extending in parallel to overlapping with the first edge,
wherein the second opening does not overlap any one of the first conductor, the second conductor, and the third conductor in a plan view.

12. The display device of claim 11, further comprising a fourth conductor provided on the substrate,
wherein the second opening is provided on the fourth conductor.

13. The display device of claim 12, wherein
the first opening and the second opening are separately disposed in a first direction, and
the first edge extends in a second direction that is different from the first direction.

14. The display device of claim 11, further comprising a signal line separated from the first conductor,
wherein the first extension is separated from the signal line.

15. The display device of claim 14, wherein
the signal line is provided in a same layer as the first conductor on the substrate.

16. The display device of claim 11, wherein
the first opening includes a second edge, and
the second edge overlaps the first extension.

17. The display device of claim 16, wherein
the second conductor further includes a second extension connected to the first extension and extending in a direction that is different from an extending direction of the first extension,
the first opening further has a third edge connected to the second edge, and
the third edge overlaps the second extension.

18. The display device of claim 11, wherein
the second insulating layer includes an organic insulating material.

19. A display device comprising:
a substrate;
a voltage line and a signal line extending in a first direction, provided on the substrate and separated from each other;
a first conductor provided on a first side of the signal line in a plan view;
a second conductor provided on a second side that is opposite to the first side of the signal line;
an insulating layer including a first opening provided on the first conductor and a second opening provided on the second conductor; and
a third conductor provided on the insulating layer and directly connected to the voltage line and the first conductor through the first opening,
wherein the voltage line includes an edge facing the signal line, and
the first conductor includes an extension extending in parallel to and overlapping with the edge.

20. The display device of claim 19, further comprising a color filter provided on the substrate and including a third opening,
wherein the first opening and the second opening are provided in the third opening.

* * * * *